United States Patent
Saxe et al.

(10) Patent No.: US 7,644,377 B1
(45) Date of Patent: Jan. 5, 2010

(54) GENERATING A CONFIGURATION OF A SYSTEM THAT SATISFIES CONSTRAINTS CONTAINED IN MODELS

(75) Inventors: James B. Saxe, Palo Alto, CA (US); Akhil Sahai, Santa Clara, CA (US); Sharad Singhal, Belmont, CA (US); Lyle H. Ramshaw, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 317 days.

(21) Appl. No.: 11/700,374

(22) Filed: Jan. 31, 2007

(51) Int. Cl.
*G06F 17/50* (2006.01)
(52) U.S. Cl. .................................. 716/1; 716/3; 716/4
(58) Field of Classification Search ............... 716/1, 716/3, 4
See application file for complete search history.

(56) References Cited

U.S. PATENT DOCUMENTS

| | | | |
|---|---|---|---|
| 5,825,660 A * | 10/1998 | Cagan et al. ................... | 703/2 |
| 7,159,198 B1 * | 1/2007 | Ip et al. ......................... | 716/5 |
| 2003/0208730 A1* | 11/2003 | Singhal et al. ................. | 716/4 |
| 2005/0228852 A1 | 10/2005 | Santos et al. | |
| 2005/0268325 A1 | 12/2005 | Kuno et al. | |
| 2008/0127000 A1* | 5/2008 | Majumder et al. ............. | 716/2 |
| 2009/0007050 A1* | 1/2009 | Martin et al. .................. | 716/16 |

OTHER PUBLICATIONS

J.B. Saxe et al., Cauldron, p. 1 (2005).
A. Sahai et al., "Automated Policy-Based Resource Construction in Utility Computing Environments," pp. 1-19 (2004).
C. Flanagan et al., "An Explicating Theorem Prover for Quantified Formulas," pp. 1-15 (2004).
L. Ramshaw et al., "Cauldron: A Policy-based Design Tool," pp. 1-10 (Jul. 2006).
R. Raman et al., "Matchmaking: Distributed Resource Management for High Throughput Computing," pp. 1-7 (1998).
S. Singhal et al., "Quatermaster—A Resource Utility System," pp. 1-12 (2004).
A. Felfernig et al., "UML as Domain Specific Language for the Construction of Knowledge-Based Configuration Systems," International Journal of Software Engineering and Knowledge Engineering, vol. 10, No. 4, pp. 449-469 (2000).
C. Flanagan et al., "Theorem Proving Using Lazy Proof Explication," CAV 2003, LNCS 2725, pp. 355-367 (2003).

* cited by examiner

*Primary Examiner*—Stacy A Whitmore
*Assistant Examiner*—Magid Y Dimyan (57) ABSTRACT

To configure a system, models of corresponding components are provided, where the models contain constraints. The models specify that at least one of the components is composed of at least another one of the components. The models are input into a design tool. The design tool generates a configuration of the system that includes the components, wherein the generated configuration satisfies the constraints contained in the models.

23 Claims, 2 Drawing Sheets

GENERATING A CONFIGURATION OF A SYSTEM THAT SATISFIES CONSTRAINTS CONTAINED IN MODELS

BACKGROUND

A system (e.g., web server system, database system, storage server system, application server system, and so forth) is made up of various components, including hardware components and software components. Systems can be complex, with many inter-related components.

Depending on requirements (including user requirements, requirements specified by operators or administrators, and technical capabilities of components), there may be various possible design configurations of the various components, including hardware and software components, for a system. For example, a configuration of a particular system can be made up of several servers, software applications, and storage devices.

Of the many possible configurations for a particular system, some of the configurations may be invalid configurations. An invalid configuration refers to a combination of components that does not achieve target requirements. As systems have become more complex, creating or maintaining valid configurations has become more difficult. Maintaining a valid system configuration is a recurring task that depends on requirements that may change over time. As requirements change, a previously identified design configuration for the system may no longer be valid. Existing tools typically do not provide for efficient creation and/or maintenance of valid configurations of systems.

BRIEF DESCRIPTION OF THE DRAWINGS

Some embodiments of the invention are described with respect to the following figures:

FIG. 1 is a block diagram of an exemplary computer that incorporates an embodiment of the invention; and FIG. 2 is a flow diagram of a process of generating a configuration of a system, according to an embodiment.

DETAILED DESCRIPTION

Figure 1:
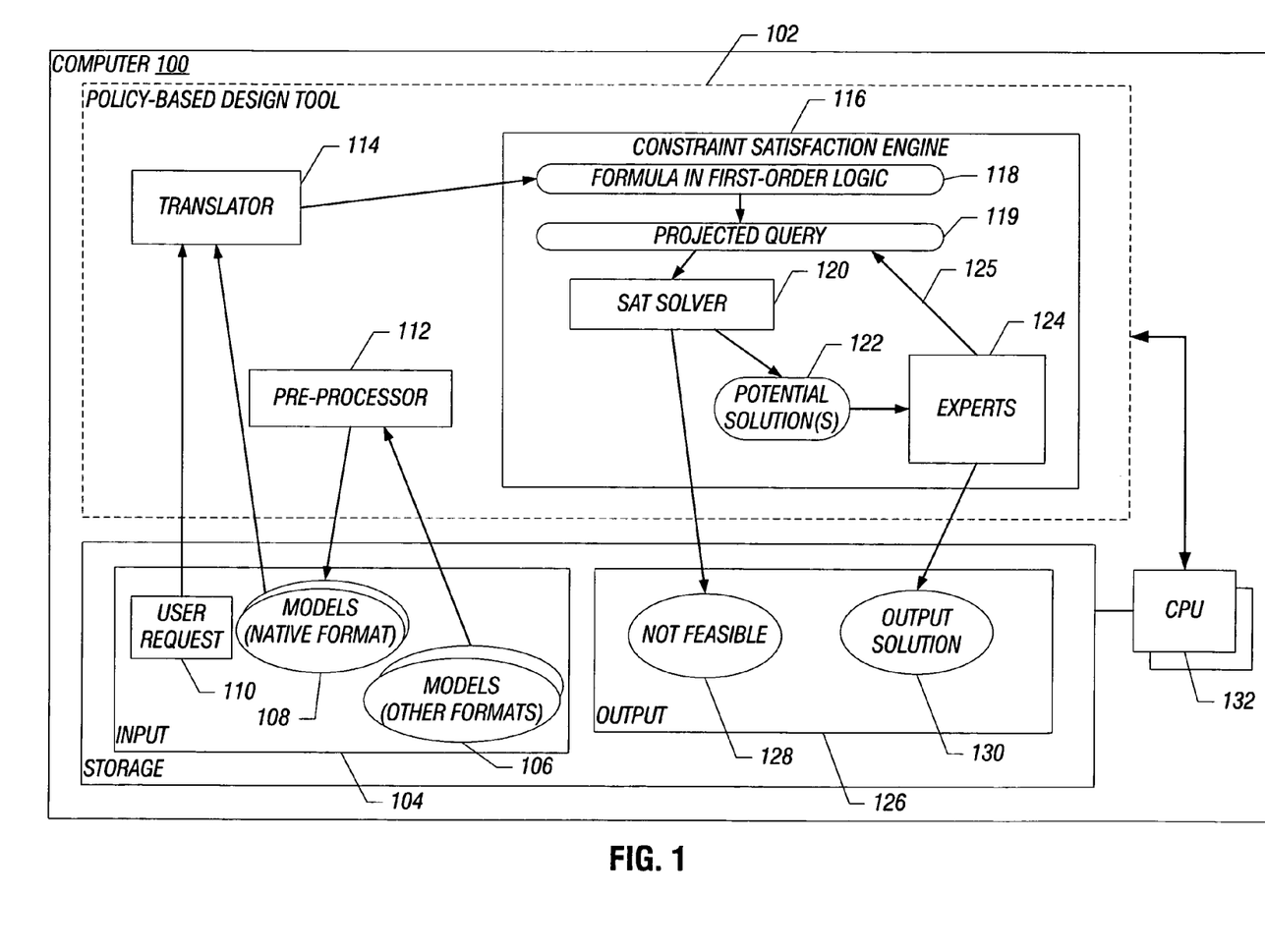

FIG. 1 shows an exemplary computer 100 that has a policy-based design tool 102 in accordance with some embodiments for designing a system (referred to as a "system under design"). To identify a configuration for the system under design, the policy-based design tool receives as input 104 a set of models 108, which are defined by class definitions containing attributes and relationships. In accordance with some embodiments, to enhance flexibility, various different relationships between models can be specified, including inheritance, reference, and association. Each model 108 represents a potential component of the system under design. The models 108 have a native format that is understood by the policy-based design tool 102. In some implementations, the input 104 to the policy-based design tool 102 also includes models 106 in other formats (e.g., according to the CIM Managed Object Format).

In some embodiments, the models 106 are based upon the Common Information Model (CIM) as provided by the Distributed Management Task Force, Inc. CIM provides an object-oriented class hierarchy that defines a hierarchy of classes (models) representing components. In one example embodiment, the class definitions for the models 106 extend the CIM_Policy class. However, in other embodiments, models according to other structures, whether proprietary or standardized, can be used to represent components of a system that is under design.

The models 108 also include constraints. The term "constraint" refers to any one or more of user requirements (requirements set by users of the tool 102 who are attempting to design a particular system), requirements set by administrators (e.g., network or system administrators), technical capabilities of components of a system under design, and any other condition that has to be satisfied. The attributes specified in a class definition represent respective characteristics of a component (or a sub-component of a component). For example, the attributes can represent a cost of the component, an operating speed of the component, a capacity of the component, and so forth. Constraints can be placed on the attributes of components. The relationships specified in a class definition refer to relationships between or among attributes of the components. In addition, the input 104 to the policy-based design tool 102 includes a user request 110 that requests a design of a particular system. Additional constraints can also be specified in the user request 110.

The models 106 can be provided to a pre-processor 112 in the policy-based design tool 102, which converts the models 106 (which can be according to the CIM Managed Object Format, for example) into the models 108 (which are in the format understood by the policy-based design tool 102). As discussed further below, constraints are embedded within the models 108 as statements (e.g., Satisfy statements) in the class definitions that represent the models 108.

The set of models 108 thus represents a set of related components. Each model contains one or more attributes along with relationships among those components. The constraints embedded in the models 108 and the user request 110, as well as the implicit constraints of the policy-based design tool 102, provide the policies that limit the values that may be taken by the attributes and/or relationships among components of the system. Implicit constraints are constraints that are implied from definitions of classes and/or from some aspects of the policy-based design tool 102. Example implicit constraints are discussed further below.

The policy-based design tool 102 treats the components of a system as resources that can be composed from other components (to provide a hierarchy of components). As components are composed to form other, higher-level components, the constraints specified in the models 108, in the user request 110, and implicitly by the design tool 102, have to be satisfied.

The policy-based design tool 102 receives the input 104 and creates a valid configuration for the system under design. A "configuration" of a system (which can be a hardware system and/or a software system) refers to a combination of components (and settings for those components). A valid configuration refers to a combination of components that satisfies specified constraints, which include constraints contained in the models 108, constraints specified in the user request 110, and constraints that are implicit within the policy-based design tool 102.

The policy-based design tool 102 also includes a translator 114 that receives the user request 110 and the models 108, and produces a formula 118 as input to a constraint satisfaction engine 116. In accordance with some embodiments, the formula 118 that is input to the constraint satisfaction engine 116 is a formula in first-order logic and linear arithmetic. In other embodiments, the translator 114 can translate the user request 110 and models 108 into other forms that are provided to the constraint satisfaction engine 116. The remaining elements of the constraint satisfaction engine 116 depicted in FIG. 1 are discussed further below.

The constraint satisfaction engine 116 then attempts to produce an instance of the design (configuration) that satisfies the specified constraints. In producing the design, the policy-based design tool 102 selects classes (specified by class definitions) that are to be used for satisfying the user request, fills in attributes values within the classes, and generates an ordered sequence of deployment activities (referred to as a workflow) that captures deployment dependencies between different classes. A class, as defined by a class definition, represents a corresponding one of the models 108. A workflow refers to a collection of activities or actions involving components of a system.

By using techniques according to some embodiments, a flexible and efficient mechanism is provided for designing configurations for systems. As constraints change over time, users can simply modify the policy constraints in the models 106, which are then converted into the models 108 provided to the policy-based design tool 102 to modify configurations according to the changed policies.

In addition to creating a configuration for a system under design, techniques according to some embodiments can be utilized for validating a configuration of an existing design to ensure that the configuration is valid (in other words, the existing configuration satisfies the various constraints mentioned above). To perform validation, the existing configuration is provided as an input to the policy-based design tool 102, which then checks each constraint to ensure that the existing configuration satisfies the constraint. Any violations of constraints are flagged and presented to a user.

In one embodiment, the user request 110 is in the form of a Main class that is composed of other classes, such that the policy-based design tool 102 produces as output an instance of the Main class, along with instances of other classes that make up the Main class, so that all specified and implicit constraints are satisfied. The instance of the Main class and instances of the classes making up the Main class provide a valid configuration of the system under design.

A class is represented as a structure type, which is a class name followed by a list of typed attributes (fields) that belong to that class. Thus, for example, Server {
cost: float;
capacity: integer;
} could represent a server (which is an example of a component of a system under design). Any instance S of this Server structure type has a cost attribute associated with it, which is referred to as "S.cost," a numeric value. The instance S also has an S.capacity attribute. As noted above, a component (represented as a structure type) can be composed of other components (represented by other structure types). For example, if the Server component is composed of a Computer component (representing a computer) and an Application component (representing a software application), then the Server structure type can have two additional fields as follows:

Server {
cost: float;
capacity: integer;
comp: Computer;
app: Application;
}

In the above, the Computer and Application structure types are also defined as class definitions with their own fields to represent corresponding attributes. In accordance with some embodiments, inheritance, such as Java-style inheritance, can be used for defining structure types as subtypes of other types. Thus, a structure type DataServer can be represented as follows:

DataServer extends Server {
data: Database;
}, where every instance of the structure type DataServer will have all the elements of the Server structure type plus a Database field. Instead of using inheritance, the DataServer structure type can alternatively be represented as an independent structure type:

DataServer {
cost: float;
capacity: integer;
comp: Computer;
app: Application;
data: Database;
}.

Under either of the former definitions of the structure type DataServer, the one using inheritance or the one using an independent type, instances of the type DataServer would have the same fields. If an instance of DataServer is referred to as DS, then the instance DS of DataServer will have five fields as follows: DS.data (according to the Database structure type), DS.comp (according to the Computer structure type), DS.app (according to the Application structure type), DS.cost (which is a number), and DS.capacity (which is also a number).

In addition to defining DataServer as extending Server, other example definitions can be provided that extend Server, such as definitions for the subtypes AppServer and StorageServer as follows:

AppServer extends Server {
. . .
},
StorageServer extends Server {
. . .
},

Note that, in this example, an implicit constraint associated with the above definitions is that any given server according to the Server class cannot be both a DataServer and an AppServer, and cannot be both a DataServer and a StorageServer, and cannot be both an AppServer and a StorageServer. That is, any two subtypes of the same parent type have to be disjoint, and this disjointness is one example of an implicit constraint.

When the policy-based design tool 102 is successful on a design problem, the tool 102 produces, as its output, a collection of structures whose fields have defined values. In some implementations, the structures in this collection form a tree without sharing of substructures. For example, suppose that the tool 102 is asked to design a data center composed of two DataServers, Main {
s1: DataServer;
s2: DataServer;
}.

An instance of the structure type Main produced by the policy-based design tool 102 can be referred to as Main0, or some other name. In the above example, the instance Main0 assigns specific DataServer instances to the components Main0.s1 and Main0.s2, and assigns values also to the attributes of those two DataServers, so as to provide a valid configuration that satisfies the relevant constraints. In the above example, there is an implicit constraint that Main0.s1 and Main0.s2 are distinct instances of class DataServer.

In the example above, the instance Main0 of the structure type Main has the components Main0.s1 and Main0.s2, which are distinct DataServers. Also, based on the above definitions for DataServer, the structures of type Computer representing Main0.s1.comp and Main0.s2.comp are also distinct (another example of an implicit constraint).

The goal of the policy-based design tool 102 is to produce the structure Main0 of the type Main together with (recursively) all the other structures that Main0 is composed of, including the two DataServers and the components of those DataServers.

In addition, other relationships can be defined between structure types, including a reference relationship and an association relationship. The reference relationship allows a structure specified in a model to refer to another structure elsewhere in a tree of structures. By using the reference relationship, a first structure can coincide with a second structure elsewhere in the tree of structures, thereby effectively enabling sharing of the second structure.

The association relationship enables various different types of associations to be defined between at least two models (structure types). Examples of the different types of associations include many-to-many associations, many-to-one associations, one-to-many associations, and one-to-one associations.

As noted above, various constraints can constrain a system-design problem. In one embodiment, the policy-based design tool 120 encodes constraints as Satisfy statements embedded in the definition of a structure type. A Satisfy statement constrains all instances of that structure type as well as all instances of any of its subtypes. For example, the class definition of Server above can be augmented with constraints in two Satisfy statements, as follows:

Server {
cost: float;
comp: Computer;
app: Application;
Satisfy cost==comp.purchaseCost+
   app.licenseFee;
Satisfy cost <=2000;
}

Here, it is assumed that each Computer component has a purchaseCost attribute and each Application component has a licenseFee attribute. In this case, the cost of the Server component is constrained to equal the sum of the purchase cost of the computer and the license fee for the application. In addition, the cost of the server is constrained not to exceed 2000.

In addition to specifying constraints in the class definitions (models), constraints can also be specified using Satisfy statements in the Main class (the user request), such as the following:

Main {
myserver: Server;
Satisfy myserver.cost <=1800;
Satisfy myserver.capacity==2500;
}

Figure 2:
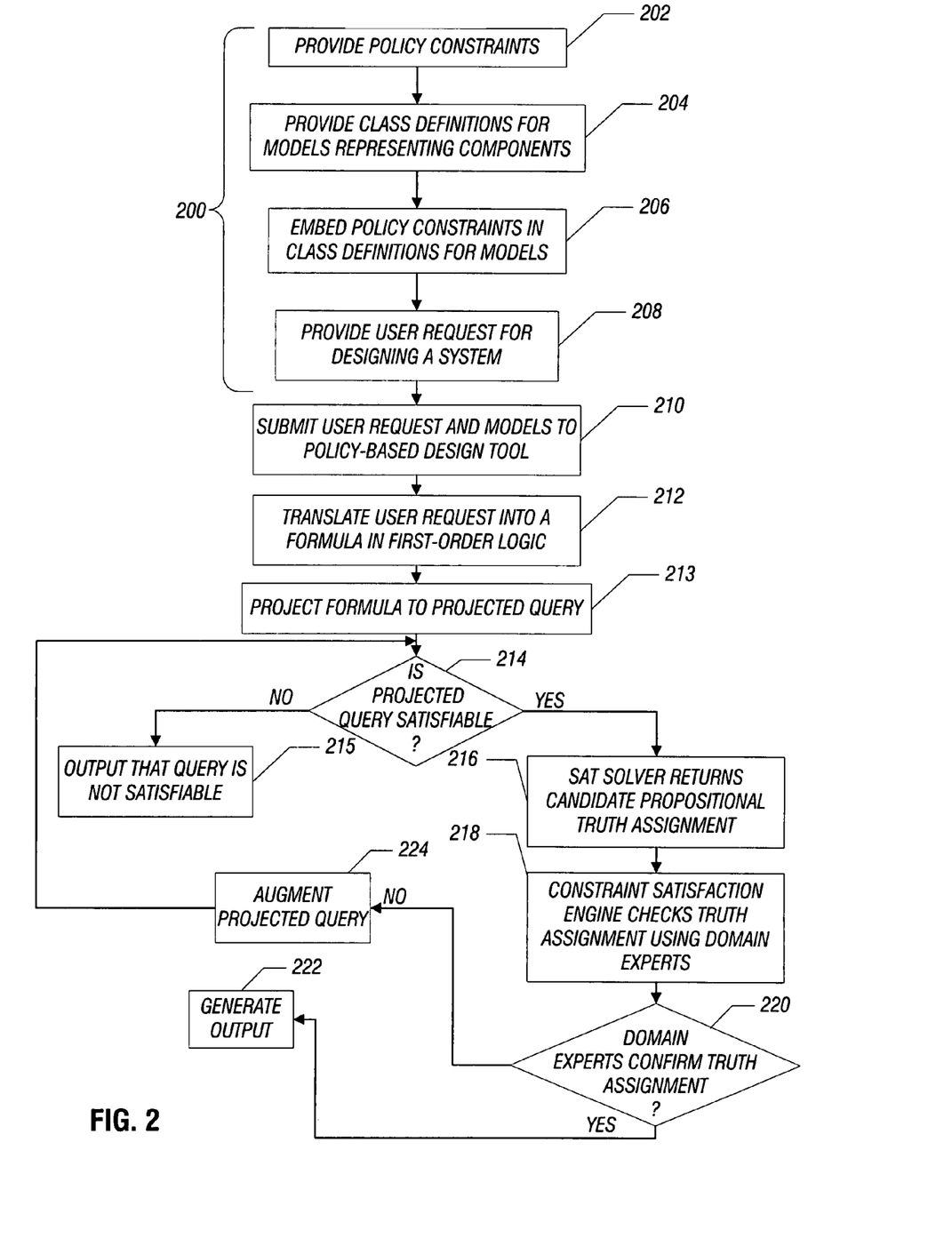

FIG. 2 shows a flow diagram of a process of creating a configuration of a system under design, in accordance with an embodiment. First, the input 104 of FIG. 1 is provided (at 200) to the policy-based design tool 102. The term "provide" can have various definitions. For example, the input can be provided by a user and/or administrator when the user and/or administrator creates and/or communicates the input. The input can be provided in the computer 100 of FIG. 1, where the term "provide" refers to receiving the input or storing the input. For example, the computer 100 can be coupled to a remote station over a data network, where the input can be received from the remote station.

In providing the input at 200, policy constraint instances are provided (at 202), and class definitions for models representing components of the system under design are provided (at 204).

Next, the policy constraint instances provided at 202 are embedded (at 206) into the class definitions provided at 204, such as in the form of Satisfy statements. The models provided at 206 can be in various formats, such as in the Managed Object Format (MOF) used within CIM. As noted above, the pre-processor 112 can translate the models 106 in those various formats into models 108 in the native format used by the policy-based design tool 102.

Next, a user request for designing a system is provided (at 208). As discussed above, the user request can be in the form of a Main structure. Tasks 202, 204, 206, and 208 are part of providing (at 200) the input 104 of FIG. 1.

Once the input 104 has been provided, the user request and models can be submitted (at 210) to the policy-based design tool 102. The translator 114 in the policy-based design tool 102 translates (at 212) the user request into a formula in first-order logic and linear arithmetic, in accordance with an embodiment. The formula is a query ("original query"). The translator 114 basically combines the attributes, relationships, and constraints of the relevant models and user request for the design under consideration into the formula in first-order logic and linear arithmetic.

In some implementations, the formula (original query) passed to the constraint satisfaction engine 116 has Boolean operators at the outermost levels of its parse tree. In performing the translation to the formula, each field of a structure type, such as the structure types discussed above, is converted into a function that extracts the value of the field. For example, if the structure type Server has a field "cost:float;" then that field is modeled using a function Server_cost in the formula, where, for any structure S of type Server, the function application Server_cost(S) models the quantity S.cost. Similarly, if the structure type Server also has a field "comp: Computer;" then the function application S_comp(S) will model the quantity S.comp. Furthermore, the translator 114 will specify, in the formula it produces, that the function value Server_comp(S) is of type Computer. The formula provided by the translator 114 is in a dialect of first-order logic that includes equality, function symbols, and linear arithmetic. The overall formula from translator 114 also includes conjuncts specifying the implicit constraints, such as the constraint that the composition hierarchy of the design is a tree (in other words, that subcomponents are not shared).

Although reference is made to a specific type of formula above, it is noted that other types of formulas can be used in other embodiments.

Many different types of constraint satisfaction engines can be utilized, including as examples, constraint satisfaction engines described in Cormac Flanagan et al., "Theorem Proving Using Lazy Proof Explication," Proceedings 15$^{th}$ International Conference on Computer Aided Verification, pp. 355-367 (2003); and Cormac Flanagan et al., "An Explicating Theorem Power for Quantified Formulas," HPL Technical Reports HPL-2004-199 (2004).

In accordance with one embodiment of the constraint satisfaction engine 116, the original query (formula) is first projected or transformed (at 213) into a projected query 119 (FIG. 1). This projection or transformation extracts, from the original query in first-order logic and linear arithmetic format, a projected query in propositional logic format. Other transformations can be performed in other implementations.

As depicted in FIG. 1, the constraint satisfaction engine 116 includes a prepositional satisfiability (SAT) solver 120, which receives the projected query. The SAT solver 120 decides the satisfiability of the projected query, and in the case where the projected query is satisfiable, returns a truth assignment for the projected query to be confirmed or not by domain experts 124.

The SAT solver 120 in the constraint satisfaction engine 116 determines (at 214) whether or not the projected query is satisfiable. If not, then an output is provided (at 215) to indicate that the projected query (and thus the original query) is not satisfiable (128 in FIG. 1). However, if the projected query is satisfiable, the SAT solver 120 discovers design choices, in the form of potential solutions 122 in FIG. 1, that conform to those of the specified policy constraints that are contained in the projected query.

In one example implementation, the original query that is passed to the constraint satisfaction engine 116 is made up of leaf formulas, which are formulas that involve equality, function applications, and arithmetic. The leaf formulas are converted to proxy variables in the projected query. The SAT solver's job is then to determine the truth or falsity of these proxy variables, in accordance with the Boolean operators at the outermost level of the parse tree. If this task proves to be impossible, the SAT solver 120 reports the projected query to be unsatisfiable, and hence the original query is also unsatisfiable.

On the other hand, if the SAT solver manages to satisfy the projected query, then the SAT solver returns (at 216) to the constraint satisfaction engine 116 a candidate propositional truth assignment (which assigns either "true" or "false" to each of the proxy variables so that the projected query is satisfied). In the example below, the proxy variables are L1, L2, L3, and L4, while the corresponding leaf formulas are provided on the right hand side of each colon after the proxy variable.

L1: $x <= y$
L2: $y <= z$
L3: $z <= x$
L4: $f(x) = f(y)$

The constraint satisfaction engine 116 next checks (at 218) the truth assignment by the SAT solver 120 using the domain experts 124 (FIG. 1). In the above example, the SAT solver 120 may have assigned "true" to proxy variables L1, L2, and L3, while assigning "false" to L4. However, this assignment would be inconsistent with the semantics of arithmetic and inequality. If L1, L2, and L3 are true, it follows by the semantics of arithmetic that the numbers x, y, and z must coincide. In particular, $x = y$. It then follows by the semantics of equality, that $f(x) = f(y)$, which contradicts the assignment of "false" to L4 by the SAT solver 120.

The domain experts 124 include a domain expert for arithmetic (more precisely, for rational linear arithmetic). The domain expert for rational linear arithmetic includes software code that understands the semantics of rational numbers and variables that range over the rational numbers. The domain expert for rational linear arithmetic understands addition and subtraction, and multiplication by a rational constant. Also, the domain expert for rational linear arithmetic also keeps track of whether arithmetic equalities and inequalities are satisfiable or not.

The domain expert for equality (more precisely, for equality with uninterpreted function symbols) understands the semantics of equality and understands that two applications of the same function whose corresponding arguments are equal yield equal results.

Other domain experts can also be used. If domain experts 124 detect (at 220) there are problems with truth assignment by the SAT solver 120 (in other words, the domain experts are unable to confirm the truth assignment), then the domain experts will encapsulate those problems as newly discovered Boolean constraints on the proxy variables. In the example above, the domain experts would augment (at 224) the projected query with the additional constraint that (L1 and L2 and L3)==>L4. The augmenting of the projected query by the domain experts 124 is depicted as 125 in FIG. 1.

The domain experts 124 may augment the projected query as soon as a single problem is discovered. Alternatively, the domain experts 124 may work on the solution(s) provided by the SAT solver 120 for some amount of time to discover various problems that can potentially be distilled into augmenting clauses before deciding to return to the SAT solver 120 with the augmented projected query. A "clause" is a Boolean relationship among proxy variables. An example of a clause is as follows: (L1 and L2 and L3)==>L4.

In yet another implementation, the SAT solver 120 can provide partial solutions (rather than a complete solution) to the domain experts 124 to allow the domain experts to refute some partial assignment. Alternatively, the domain experts may offer guidance to the SAT solver by extending the current partial assignment (that is, by directly setting the truth assignment of proxy variables that were unassigned) or by supplying new clauses (possibly containing new proxy variables).

In a further alternative, instead of domain experts 124 supplying clauses to refute specific assignment proposed by the SAT solver 120, the domain experts 124 can instead supply clauses even before any assignment is provided by the SAT solver 120, which clauses are determined by the domain experts as clauses that are likely to steer the SAT solver 120 away from incorrect assignment.

Output is then generated (at 222) by the constraint satisfaction engine 116, which output represents the valid configuration that satisfies constraints specified in the original query. The output solution contains specific assignment of values to attributes of the components making up the system under design. For example, a multi-tier system (having several tiers of components such as web servers, application servers, database servers, etc.) can be designed, with attributes of the various components set to specific values and relationships between components selected. Also, workflow for the system can be defined. In the multi-tier system example above, one workflow constraint may be that the database servers has to be up and running before the application servers can be installed and configured.

As noted above, a workflow is an ordered sequence of deployment activities that captures deployment dependencies between different classes. The deployment activities can be modeled in a manner similar to resources (such as the components of a system under design referred to above). A model for an activity has one or more attributes that can specify when an activity is to be performed. In one example, the one or more attributes of an activity model can specify a start time (or date), an end time (or date), and a duration. The activity model can also specify (by use of one or more constraints) whether there is a deadline associated with the activity.

As with the ability to compose one component of a system under design from other components, one activity can also be composed from other activities. Each activity model can be associated with post-conditions and pre-conditions, which post and pre-conditions can be used to define a sequence of activities for a workflow.

A model for a particular component of a system under design can include constraints that specify associations between activities and between an activity and the component. As a result of constraint satisfaction, a set of components for a system under design are selected along with a set of activities (and their associated sequence to define a workflow).

By using the policy-based design tool 102 according to some embodiments, various benefits may be realized. Constraint specification is made easier by allowing users and/or administrators to specify the constraints in a hierarchical and distributed manner. Updating components is made easer (by adding or modifying respective class definitions). If a particular constraint is modified, then a new set of attribute values can be automatically computed by the design tool 102 under which the configuration meets all constraints. Also, new components can be also be easily added by adding new class definitions. In addition, by using the policy-based design tool 102, a user (system designer) does not have to be concerned about how to specifically compose system.

The following provides an example input and output of the policy-based design tool 102. The following are example class definitions:

```
Resource {
    cost: float;
}

Computer extends Resource {
    kind: String; //Brand of hardware
    megs: int; //Amount of memory
    os: String; //Operating system
    Satisfy kind \in {"Acme," "Brand_X"};
    Satisfy kind=="Acme"==>cost==1200+megs;
    Satisfy kind=="Brand_X"==>cost==800+2*megs;
    Satisfy os \in {"Archways," "Barndoors"};
    Satisfy kind=="Brand_X"==>os=="Barndoors;"
}

Application extends Resource {
    kind: String;
    Satisfy kind \in {"Able," "Baker"};
    Satisfy kind=="Able"==>cost==300;
    Satisfy kind=="Baker"==>cost==0;
}

Server extends Resource {
    comp: Computer;
    app: Application;
    capacity: float;
    Satisfy cost==comp.cost+app.cost;
    Satisfy app.kind=="Able"==>capacity==comp.megs*10;
    Satisfy app.kind =="Baker"==>capacity==comp.megs*5;
    Satisfy app.kind =="Able"==>comp.os=="Archways;"
}
```

In the above example, the Resource class represents a low-level component that is associated with an attribute cost. The Computer, Application, and Server class definitions inherit from the Resource class. Each of the computer, application, and server classes above defines respective attributes, as well as policy constraints in the form of Satisfy statements.

In addition, below is an example user request in the form of a Main structure type:

```
Main {
    myserver: Server;
    Satisfy myserver.cost<=1800;
    Satisfy myserver.capacity==2500;
}
```

The example Main user request is submitted to design a server (according to the Server class). After submitting the class definitions and user request to the policy-based design tool 102, an output solution (130 in FIG. 1) is generated. For the above example, an example output can appear as follows:

```
%% startup
%% assignment
$0: Main {
server=$1: Server {
    cost=1700;
    comp=$2: Computer {
        cost=1700;
        kind="Acme";
        megs=500;
        os="Archways";
    };
    app=$3: Application {
        cost=0;
        kind="Baker";
    };
    capacity=2500;
};
}
%% assignment warnings
%% end
```

In the output, Main.Server has an identifier $1, Main.Server.Comp (which represents the computer in the server) has an identifier $2, and Main.Server.App (which is the software application in the server) has an identifier $3. Note also that the various attributes of the various components are assigned specific values. The output above is an example configuration of a system that satisfies policy constraints.

As discussed further above, the policy-based design tool 102 supports composition and inheritance in class definitions for models that represent components of systems under design. The policy-based design tool 102, according to some implementations, can also support the following features.

The policy-based design tool 102 can support ranges of integers and user-specified enumerated types. Thus,

```
enum ServerType {itanium, x86};
TypedServer {
Id: 0 . . . 50;
serverType: ServerType;
}
``` specifies that Id is an integer in the range [0,50], and that serverType is an enumerated field that can contain either the value "itanium" or "x86".

To provide enhanced flexibility, the policy-based design tool 102 can also support array types, group operators, references, and associations. An array type allows instances of components to be referred to in an array format, such as the following:

```
DataCenter {
serv: DataServer[12];
Satisfy serv[7].cost<=1500;
}
```

In the above example, if DC is an instance of the DataCenter structure type, then DC.serv denotes an array of 12 DataServer instances. The entries in this array are referred to as DC.serv[0] through DC.serv[11].

Group operators can also be specified, such as gand (group AND), gor (group OR), and gadd (group ADD). For example, the following Satisfy statement:

Satisfy gand (i, serv, serv[i].cost<=1750);

specifies that each of the DataServer instances in the array "serv" should have a cost of at most 1750. The operator gand (group AND) thus forms a conjunction over the entries of an array. The gor (group OR) operator similarly forms a disjunction over the entries of an array, while the gadd (group ADD) operator forms such a sum. Generally, a group operator is provided as part of a constraint in a class definition and specifies a logical condition that applies to plural instances of a particular class; in the above "gand" example, the plural DataServer instances should have a cost less than or equal to 1750. Alternatively, the logical condition can be a logical OR condition that applies to the plural instances.

References are also supported by the policy-based design tool 102 to allow structures to refer to other structures within a tree of components, such as the tree of components of the Main structure. As an example, consider the following definition:

DataCenter {
serv: DataServer[..12];
manager: ref DataServer;
}

(Because the length of the array "serv" is given as "..12", rather than simply "12", that array may have any length from 0 through 12).

If DC is an instance of the DataCenter structure type, then DC.manager is an instance of the DataServer structure type. However, since manager is defined as a ref type (reference type), DC.manager can coincide with a DataServer that exists elsewhere in the instance of Main. For example, DC.manager can equal DC.serv[i] for some i. This type of sharing can be expressly specified using the following example constraint:

Satisfy gor(i, serv, manager ==serv[i]);

Arrays of refs are also possible, in accordance with some implementations. For example, a manager task can be distributed across two of multiple DataServer instances, as follows:

DataCenter {
serv: DataServer[..12];
manager: (ref DataServer)[2];
Satisfy gand(i, manager, gor(j, serv, manager[i]==serv[j]));
Satisfy manager[0] !=manager[1];
}

In the foregoing example, the two "manager" components are chosen from among the up-to-12 possible DataServer instances (as specified by the first Satisfy statement). The second Satisfy statement ensures that the two manager components are distinct.

Associations between different structure types can also be defined, such as a many-to-many association between the structure types Database and Disk (as examples). This many-to-many association between the types Database and Disk specifies which disks can potentially store data from which databases. In one example, assuming that every database stores data on somewhere between 2 and 100 disks, while every disk stores data from somewhere between 0 and 10 databases, the following definitions of Database and Disk can be provided:

Database {
disks: (ref Disk)[.100];
Satisfy disks.length>=2;
Satisfy gand(i, disks, gand(j, disks, disks[i]==disks[j] ==>i==j));
Satisfy gand(i, disks, gor(j, disks[i].bases, disks[i].bases[i]==this));
}
Disk {
bases: (ref Database)[..10];
Satisfy gand(i, bases, gand(j), bases, bases[i]==bases[j] ==>i==j));
Satisfy gand(i, bases, gor(j, bases[i].disks, bases[i].disks[j]==this));
}

In the Database class definition, the array "disks" includes up to 100 references to instances of the Disk structure type. Also, the constraint "Satisfy disks.length >=2" specifies that each database has to be stored on two or more disks. The nested gand (group AND) constraint (Satisfy constraint with two gands) ensures that the references in the array "disks" refer to distinct structures of type Disk, to avoid (for example) the situation where B.disks[0] coincides with B.disks[1], and hence that single disk is counted twice as storing portions of the Database B. The last constraint (last Satisfy statement in the Database definition) is a gand of a gor, which ensures that the two ends of the association (in this case Database and Disk) agree about which pairs of structures are associated. In other words, if database B specifies that database B is stored on disk D, then disk D has to agree that database B is one of the databases that disk D stores. In the last Satisfy statement, the special token "this" is used to refer to the containing object (as in Java, for example).

The "ref" clause and Satisfy statements of the Disk definition are analogous to the corresponding clauses in the Database definition. As noted above, the two definitions above provide an example of a many-to-many association between different structure types. Another type of association that can be specified is many-to-one. For example, a server may run many jobs, but each job is assigned to just one server (many jobs to one server association). An example definition that provides for such a many-to-one association is provided below:

Job {
myserver: ref Server;
Satisfy gor(i, myServer.myJobs, myServer.myJobs[i]==this);
}
Server {
myjobs: (ref Job)[...50];
Satisfy gand(i, myJobs, gand(j, myJobs, myjobs[i]==myJobs[j]==>i==>j));
Satisfy gand(i, myjobs, myJobs[i].server==this);
}

In the example above, the Job definition makes reference to just one server (myServer) of structure type Server (rather than making reference to multiple servers), since each job can run on just one server in this example. Note that, for this many-to-one association, the last Satisfy statement of the Server definition includes just a gand, rather than a gand of a gor.

Another type of association is a one-to-one association, such as where one server can execute just one job, and one job can run on just one server. The following is an example of such a one-to-one association:

Job {
...
myServer: ref Server;
Satisfy myServer.myJob==this;
}
Server {
...
myJob: ref Job;
Satisfy myJob.myServer ==this;
}

Instructions of software described above (including the pre-processor 112, translator 114, and constraint satisfaction engine 116 in FIG. 1) are loaded for execution on a processor (e.g., CPU 132 in FIG. 1). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of configuring a system, comprising:
providing models of corresponding components, wherein the models contain constraints, wherein the models specify that at least one of the components is composed of at least another one of the components, and wherein at least one of the models specifies a structure that refers to another structure in a collection of the components;
inputting the models into a design tool executing in a computer; and
generating, by the design tool executing in the computer, a configuration of the system that includes the components, wherein the generated configuration satisfies the constraints contained in the models.

2. The method of claim 1, wherein providing the models further comprises specifying an association between at least two of the models.

3. The method of claim 2, wherein specifying the association between the at least two models comprises specifying one of a many-to-many association, many-to-one association, and one-to-many association.

4. The method of claim 3, wherein the at least two models comprise a first model and a second model, and wherein the first model contains a structure that refers to a structure of the second model, and the second model contains a structure that refers to a structure of the first model.

5. The method of claim 2, wherein specifying the association between the at least two models uses constraints that include at least one of group AND and group OR operators.

6. The method of claim 1, wherein providing the models comprises providing respective class definitions that include statements specifying corresponding constraints.

7. The method of claim 1, further comprising providing a request to design the system to the design tool.

8. The method of claim 7, further comprising translating, using the design tool, the models and request into a formula in first order logic.

9. The method of claim 8, further comprising invoking a constraint satisfaction engine in the design tool to solve the formula.

10. The method of claim 1, wherein the design tool is associated with at least one implicit constraint in addition to the constraints of the models, and wherein generating the configuration of the system comprises generating the configuration that also satisfies the implicit constraint.

11. The method of claim 1, wherein providing the models comprises providing the models associated with corresponding attributes, and wherein generating the configuration comprises assigning specific values to the attributes.

12. The method of claim 1, wherein providing the models comprises providing models in an object-oriented class hierarchy.

13. The method of claim 1, wherein generating the configuration comprises generating a workflow that specifies at least one action relating to one or more of the components of the system.

14. The method of claim 1, wherein the design tool comprises a satisfiability solver and at least one domain expert, the method further comprising;
using the satisfiability solver to solve an input query to produce a solution for the configuration;
using the at least one domain expert to check the solution; and
the at least one domain expert returning an indication of an incorrect assignment in the solution.

15. The method of claim 14, further comprising:
augmenting the input query in response to the incorrect assignment; and
re-solving the augmented query by the satisfiability solver to produce a solution.

16. The method of claim 1, wherein generating the configuration comprises generating the configuration that includes a combination of the components and settings for the components.

17. The method of claim 1, wherein a first of the models specifies that a first of the components is composed of a second of the components, and a second of the models specifies that a third of the components is composed of a fourth of the components.

18. The method of claim 1, wherein a first of the models specifies that a first of the components is composed of a second of the components by using inheritance.

19. A computer-readable storage medium that when executed cause a computer to:
provide models of corresponding components, wherein the models contain constraints, wherein the models specify a first relationship in which at least one of the components is composed of at least another one of the components, and wherein the models specify a second relationship among components in addition to the first relationship, wherein the second relationship comprises at least one of a reference relationship and an association relationship;
input the models into a design tool; and
invoke the design tool to generate a configuration of the system that includes the components, wherein the generated configuration satisfies the constraints contained in the models.

20. The computer-readable storage medium of claim 19, wherein at least one of the models contains a structure having an array type.

21. The computer-readable storage medium of claim 19, wherein the design tool comprises a satisfiability solver and at least one domain expert, wherein the instructions when executed cause the computer to further:
use the satisfiability solver to solve an input query to produce a solution for the configuration;

use the at least one domain expert to check the solution; and
cause the at least one domain expert to return an indication of an incorrect assignment in the solution.

22. The computer-readable storage medium of claim 19, wherein generating the configuration comprises generating the configuration that includes a combination of the components and settings for the components.

23. The computer-readable storage medium of claim 19, wherein a first of the models specifies that a first of the components is composed of a second of the components, and a second of the models specifies that a third of the components is composed of a fourth of the components.

* * * * *

UNITED STATES PATENT AND TRADEMARK OFFICE
CERTIFICATE OF CORRECTION

PATENT NO. : 7,644,377 B1
APPLICATION NO. : 11/700374
DATED : January 5, 2010
INVENTOR(S) : James B. Saxe et al.

It is certified that error appears in the above-identified patent and that said Letters Patent is hereby corrected as shown below:

In column 14, line 19, in Claim 14, delete "comprising;" and insert -- comprising: --, therefor.

Signed and Sealed this

Fourth Day of May, 2010

David J. Kappos
*Director of the United States Patent and Trademark Office*